US012574388B2

(12) United States Patent
Linton et al.

(10) Patent No.: US 12,574,388 B2
(45) Date of Patent: Mar. 10, 2026

(54) NETWORK-BASED ATTESTATION OF DEVICE OWNERSHIP

(71) Applicant: International Business Machines Corporation, Armonk, NY (US)

(72) Inventors: Jeb R. Linton, Manassas, VA (US); Mauro Marzorati, Lutz, FL (US); James Edward Regan, Brookfield, CT (US); Nikki Elyse Robinson, Davidsonville, MD (US)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 18/215,926

(22) Filed: Jun. 29, 2023

(65) Prior Publication Data

US 2025/0007922 A1     Jan. 2, 2025

(51) Int. Cl.
*H04L 9/00*          (2022.01)
*H04L 9/40*          (2022.01)

(52) U.S. Cl.
CPC ............ *H04L 63/12* (2013.01); *H04L 63/168* (2013.01)

(58) Field of Classification Search
CPC .............................. H04L 63/12; H04L 63/168
See application file for complete search history.

(56) References Cited

U.S. PATENT DOCUMENTS 9,380,053 B1      6/2016  Behnken et al.
10,803,175 B2    10/2020  Vasudevan et al.

11,205,011 B2    12/2021  Jakobsson et al.
11,334,388 B2     5/2022  Jakobsson
11,431,561 B2     8/2022  Smith et al.
11,588,857 B2     2/2023  Kraning et al.
(Continued)

FOREIGN PATENT DOCUMENTS

WO        WO2017/131775 A1      8/2017

OTHER PUBLICATIONS

"At 13.7% CAGR, Network Detection and Response (NDR) Market Size Worth US$ 5370.4 Mn by 2028 | NDR Industry Business Strategies, Progression Status, Opportunities, Future Trends, Market Share, Drivers, Challenges, Restraints, Growing Demand", GlobeNewswire, Jun. 8, 2022, 10 pages.
(Continued)

*Primary Examiner* — Syed M Ahsan
(74) *Attorney, Agent, or Firm* — CANTOR COLBURN LLP; Anthony Mauricio Pallone

(57)                ABSTRACT

Mechanisms are provided for computing device attestation. An attestation request is received, from a requestor computing device, for attestation of a target computing device. The attestation request includes a computing device network address of the target computing device. A first lookup operation of the computing device network address is performed in a domain name service (DNS) server to obtain a device name for the target computing device. A second lookup operation of the device name is performed in the DNS server to obtain a text resource record corresponding to the device name. The text resource record stores attestation information for the target computing device corresponding to the device name. Attestation information is extracted from the text resource record and returned to the requestor computing device to perform attestation of the target computing device.

20 Claims, 6 Drawing Sheets

(56)                References Cited

U.S. PATENT DOCUMENTS

| | | | | |
|---|---|---|---|---|
| 2007/0143127 | A1* | 6/2007 | Dodd | G06Q 10/02 |
| | | | | 705/5 |
| 2016/0337181 | A1* | 11/2016 | Cathrow | H04L 63/123 |
| 2018/0077109 | A1* | 3/2018 | Hoeme | H04L 61/4511 |
| 2021/0067520 | A1 | 3/2021 | Wang et al. | |
| 2022/0052859 | A1 | 2/2022 | Marzorati et al. | |

OTHER PUBLICATIONS

"IBM to Expand Security Portfolio with Plans to Acquire ReaQta", IBM Corporation, Nov. 2, 2021, 3 pages.

Anonymous, "Discovering Network Connectivity Among Network Devices Based on Topological Information", IP.com Prior Art Database Technical Disclosure, IP.com No. IPCOM000146923D, Feb. 27, 2007, 25 pages.

Anonymous, "Distributed Transfer Learning on Embedded Devices", IP.com Prior Art Database Technical Disclosure, IP.com No. IPCOM000256511D, Dec. 5, 2018, 11 pages.

Anonymous, "Utilization of Non-Fungible Tokens Persisting on a Permissioned Blockchain in an Edge System to Allow Time-Sensitive Electronic Access Control of a Premises", IP.com Prior Art Database Technical Disclosure, IP.com No. IPCOM000271723D, Feb. 3, 2023, 7 pages.

Asokan, N. et al., "SEDA: Scalable Embedded Device Attestation", Proceedings of the 22nd ACM SIGSAC Conference on Computer and Communications Security (CCS'15), Oct. 12-16, 2015, 12 pages.

Banks, Alexander S. et al., "Remote Attestation: A Literature Review", arXiv:2105.02466v2 [cs.CR], May 12, 2021, 34 pages.

Jenkins, Ira R. et al., "Distributed IoT Attestation via Blockchain (Extended Version)", 1st Workshop on Secure IoT, Edge and Cloud systems (SloTEC) 2020, Nov. 2-5, 2020, 11 pages.

Watrobski, Paul et al., "Trusted Internet of Things (IOT) Device Network-Layer Onboarding and Lifecycle Management", National Institute of Standards and Technology (NIS), National Cybersecurity Center of Excellence (NCCoE), May 2021, 13 pages.

Welekwe, Amakiri, "The Best Network Detection and Response Software", Comparitech, Jun. 6, 2023, 21 pages.

* cited by examiner

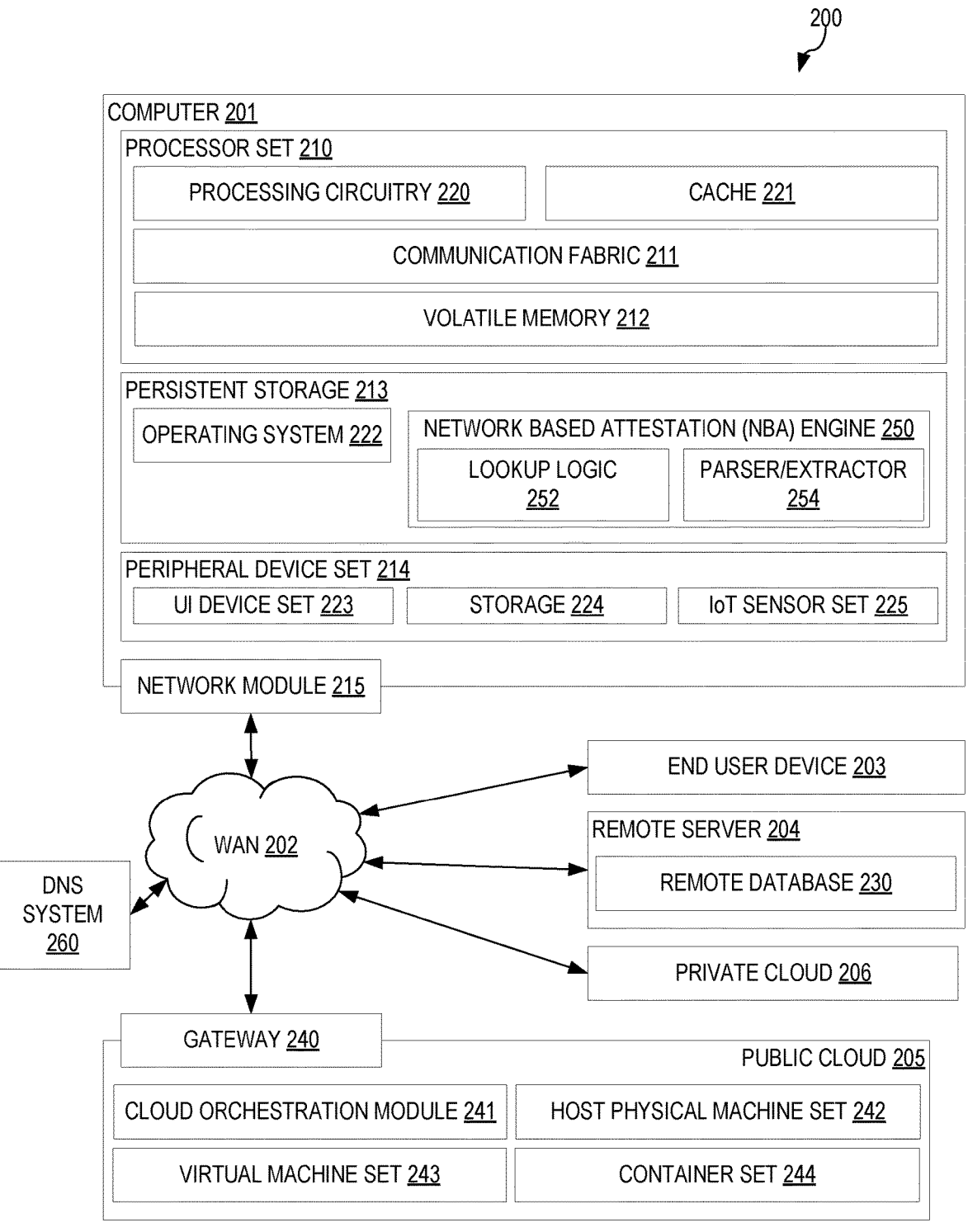

200

COMPUTER 201

PROCESSOR SET 210

PROCESSING CIRCUITRY 220          CACHE 221

COMMUNICATION FABRIC 211

VOLATILE MEMORY 212

PERSISTENT STORAGE 213

OPERATING SYSTEM 222

NETWORK BASED ATTESTATION (NBA) ENGINE 250

LOOKUP LOGIC 252          PARSER/EXTRACTOR 254

PERIPHERAL DEVICE SET 214

UI DEVICE SET 223          STORAGE 224          IoT SENSOR SET 225

NETWORK MODULE 215

WAN 202

DNS SYSTEM 260

END USER DEVICE 203

REMOTE SERVER 204

REMOTE DATABASE 230

PRIVATE CLOUD 206

GATEWAY 240

PUBLIC CLOUD 205

CLOUD ORCHESTRATION MODULE 241          HOST PHYSICAL MACHINE SET 242

VIRTUAL MACHINE SET 243          CONTAINER SET 244

*FIG. 2*

NETWORK-BASED ATTESTATION OF DEVICE OWNERSHIP

BACKGROUND

The present application relates generally to an improved data processing apparatus and method and more specifically to an improved computing tool and improved computing tool operations/functionality for performing network-based attestation of device ownership.

In cloud-based networks, it is often necessary to verify the ownership of devices and processes, so as to determine what parties are responsible for problems that may occur in cloud computing resources, e.g., platforms, services, infrastructures, and the like, and/or the applications that employ these cloud computing resources. However, there are numerous problems involving attesting ownership and managing responsibility with cloud-based network-connected devices in public cloud deployments having managed service providers and shared responsibility models. Legacy device attribution models rely on coarse public registration records that generally only provide registrant information, not current use or assignment as defined by the registrant, who may subdivide their allocated resource to either themselves or third parties, such as is often done by a Managed Service Provider (MSP) or Communications Service Provider (CSP).

What is a common trait in cloud computing system deployments is that there is no single reliable way in which an operator may make attestations, which would be understood or accepted by third parties, even if they knew to look for these attestations in the location made. This also illustrates the reverse of the problem, which is that assessors and third party independent auditors of security practitioners cannot make reliable attribution of responsibility/resolution of findings.

Mechanisms do exist to make attestation of ownership of devices based on cryptographically signed certificates on existing Transport Layer Security (TLS)-based services. However, these require the attestation by the device itself.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for computing device attestation. The method comprises receiving, from a requestor computing device, an attestation request for attestation of a target computing device. The attestation request comprises a computing device network address of the target computing device. The method further comprises performing a first lookup operation of the computing device network address in a domain name service (DNS) server computing device to obtain a device name for the target computing device. The method also comprises performing a second lookup operation of the device name in the DNS server to obtain a text resource record corresponding to the device name. The text resource record stores attestation information for the target computing device corresponding to the device name. In addition, the method comprises parsing the text resource record to extract the attestation information from the text resource record, and returning the attestation information to the requestor computing device to perform attestation of the target computing device.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 2 is an example diagram of a distributed data processing system environment in which aspects of the illustrative embodiments may be implemented and at least some of the computer code involved in performing the inventive methods may be executed;

DETAILED DESCRIPTION

The problems of multiple layers of responsibility for issues in cloud computing offerings, e.g., Infrastructure-as-a-Service (IaaS), Platform-as-a-Service (PaaS), Software-as-a-Service (SaaS), Containers-as-a-Service (CaaS), Function-as-a-Service (FaaS), and Legacy/On-Premises deployments, has been analogized to the Pizza-as-a-Service example. Various formulations of this example are available, but one example infographic of this example is shown in FIG. 1.

Figure 1:
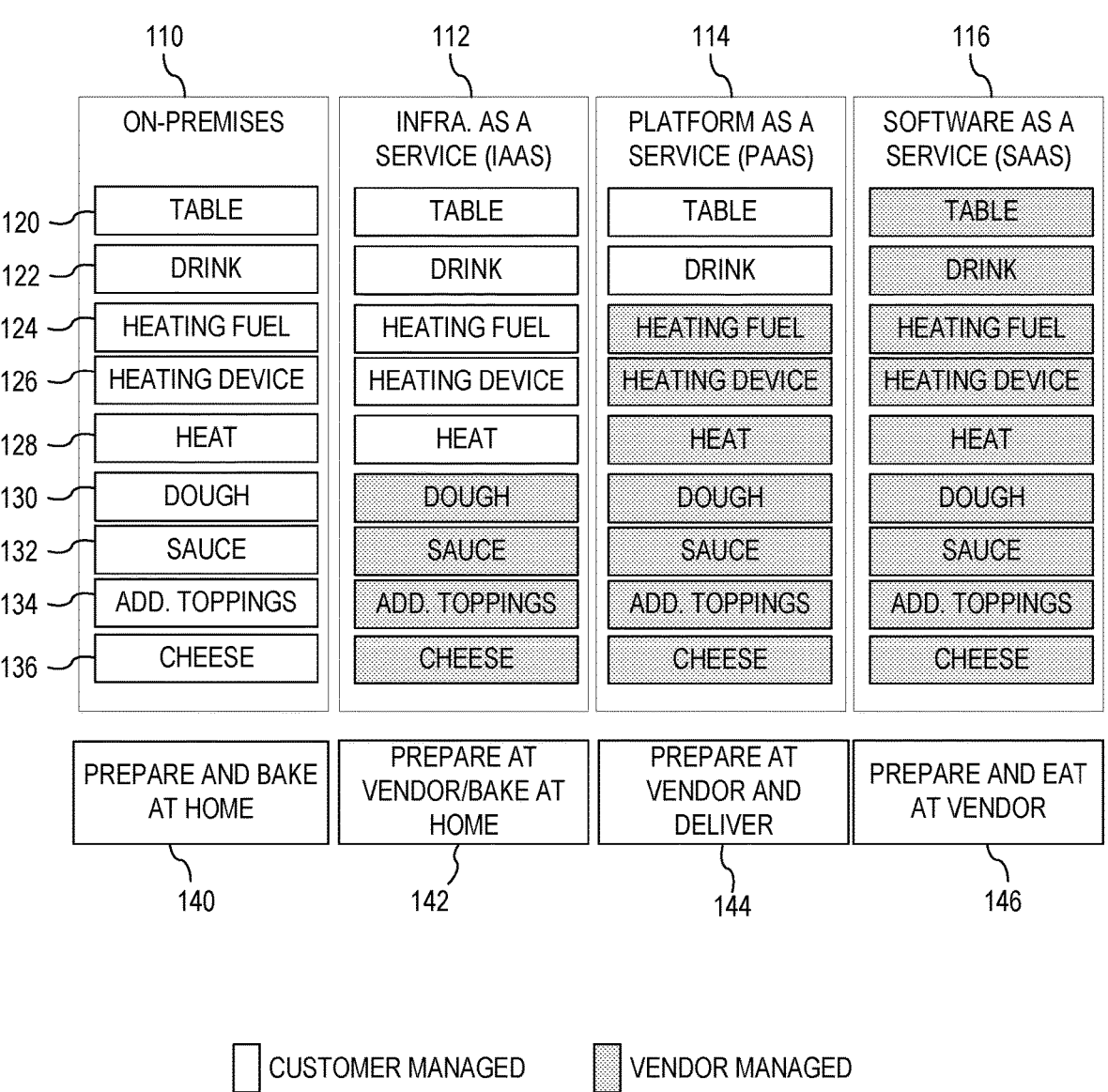
FIG. 1 is an infographic of a Pizza-as-a-Service analogy example for illustrating the problems of multiple layers of responsibility in cloud computing systems.

FIG. 1 shows in each of the columns 110-116 the different configurations of a computing system, including traditional on-premises (legacy) configurations 110, IaaS 112, PaaS 114, and SaaS 116. The rows 120-136 of the columns corresponding to different layers of the configuration of the computing system analogized to elements required to provide a pizza to a customer. In a computing system configuration, these elements may correlate to layers of the computing system configuration including the hardware, the virtualization, operating system (OS), runtime, scaling, functions, and configuration layers, for example. The analogy of the columns 110-116 of the different configurations is shown along the bottom as elements 140-146, e.g., prepare and bake at home (homemade), prepare at the vendor/bake at home (take-and-bake), prepare at the vendor and have it delivered (pizza delivery), and prepare and eat at the vendor location (dining out at a restaurant). At each element in the columns, where each column has the same elements, the shading of the element demonstrates the responsibility for that element between the customer or user, and the pizza vendor, or computing system provider.

As can be seen from FIG. 1, the traditional on-premises computing system configuration 110, like homemade pizza, requires that the user/customer do everything and has complete responsibility for any issues that may occur, e.g., a datacenter configuration for example. In the IaaS configuration 112, or take and bake, the kitchen is shared with others, and the utilities and oven are provided, but the user/customer must make and cook the pizza themselves. Thus, as shown, the responsibility for different layers of the configuration or computing stack indicate that the user/customer is responsible for the fire, oven, electric/gas, soda, and dining table, but the provider/vendor manages and is responsible for providing the components of the pizza. In the PaaS configuration 114, or pizza delivery, the user/customer orders the pizza for delivery, the vendor or provider makes the pizza and delivers the pizza to the user/customer, and the user/customer is only responsible for the soda and the dining table. That is, the vendor/provider is responsible for everything needed to make the pizza and provide the pizza for consumption and the user/customer need only provide the environment for the consumption of the pizza. Finally, in the SaaS configuration 116, or restaurant/dine out, the vendor/provider is responsible for all aspects of the pizza experience, including the elements for making the pizza and for providing the environment in which the user/customer can consume the pizza.

Thus, it can be seen from this example, the responsibilities for different layers of the computing stack are different depending on the configuration of the cloud computing system offering. Thus, if a fault or issue occurs in the providing of a service or product, e.g., a pizza in this case, it is important to determine where the responsibility for the fault or issue lies in order to determine how best to address it and who should address it. For example, in the IaaS example (column 112) if there is a problem with the pizza that is consumed, e.g., it tastes bad, is the problem due to a problem with the ingredients or due to the way in which the pizza was cooked? Depending on which fault or issue is determined to exist, the responsibility may be with either the vendor (problem with the ingredients, e.g., wrong toppings) or the customer (problem with the cooking of the pizza, e.g., the pizza is not fully cooked).

The example in FIG. 1, is a simplified example in which there is only one customer. The problem of determining responsibility in the case of faults or issues in the computing system configuration becomes even more complex when one considers multitenancy in service offerings and the attribution of different components within the computing stack.

The problem of determining responsibility in the case of faults or issues in computing system configurations may also be more complex when there are multiple vendors involved. Thus, it is important to be able to attest ownership of devices and components of cloud computing systems in order to identify responsible parties for fault or issue remediation, e.g., if a fault occurs in a specific device, determining who is responsible for that device. Moreover, it is important to perform such attestation with minimal requirements for storage of attestation information and for the configuring of the devices to perform such attestation.

The illustrative embodiments provide a mechanism that can be easily retrofitted onto existing facilities such that popular adoption can be expected. The illustrative embodiments provide computer mechanisms that store and manage the attribution information in a scalable manner, as well as publicize the same, using legacy transport protocols. That is, the illustrative embodiments provide an improved computing tool and improved computing tool functionality/operations that provide network-based attestation of device ownership. The attestation being done within the network, means that access to endpoint devices for which the attestation is being made is not required. As an analogy, this is similar to saying "city speed limit=30 MPH" and because of the hierarchical nature of the Domain Name System (DNS), one can still say the "neighborhood speed limit=45 MPH" without contradicting the city-wide assertion.

The illustrative embodiments provide the capability to leverage network constructs to reliably attest ownership of connected devices, either physical or virtual devices, directly from the network management plane without incurring the cost and complexity of end-device operations. Specifically, the illustrative embodiments provide an attestation language that is implementable within a network accessible device, such as in Domain Name System (DNS) constructs. The illustrative embodiments provide mechanisms permitting program code to leverage the language, implementable in any network-accessible device, and provide a deployment mechanism that leverages the program code and language, implementable as a retrofit of cloud-operated networks.

In some illustrative embodiments, the improved computing tool and improved computing tool functionality/operations utilize a protocol that comprises an on-demand limited size message broadcast service that is modified to provide attestation information for devices. In some illustrative embodiments, a "Quote of the Day" (QOTD) protocol is utilized There exists a QOTD protocol that defines a service whereby a server, by performing a connection reply in response to a request from a client device, where the connection reply has a limited size, e.g., a 512-byte string of characters that indicates the quote of the day. The QOTD protocol is very lightweight and upon establishing a connection to the server on a designated port, e.g., port 17, the server replies with a QOTD string, and the connection is terminated. Rather than the QOTD string, the illustrative embodiments provide mechanisms to modify this QOTD protocol to instead provide attestation information that can be used to attest ownership of devices.

The illustrative embodiments further comprise mechanisms for modifying the storing of information of different resource types in Domain Name System (DNS) servers via resource records (RRs). For example, in a DNS, the Address (A) and quad A (AAAA) RR types are for forward (name-to-number) resolution of Addresses, i.e., textual name to Internet Protocol (IP) address resolution, while Pointer Record (PTR) RR types are for reverse (number-to-name)

resolution of these same addresses, i.e., IP address to textual name. In addition, a text (TXT) RR type may be used for storing of arbitrary textual data which are leveraged by different protocols, as well as for providing attestation of ownership through storage of cryptographically signed tokens. Moreover, RFC 4398 CERT records allow for the direct storage and delivery of cryptographic certificates and accompanying revocation lists through DNS, with this being extended to Secure DNS in RFC 6944.

The illustrative embodiments adapt these elements to provide an improved computing tool and improved computing tool functionality/operations for storing device ownership attestation information, such as in a DNS server, and for management of such, through the implementation of delimited, e.g., semi-colon separated, key-value tuples in a DNS TXT resource record. For example, an example of a TXT record according to one illustrative embodiment may be of the type:

devicename IN TXT "v=attrib1; scope=[ports covered]; bo=[business owner]; so=[security owner]; ac=[additional contact]; include=[external reference]; mi=[URL for more information]; [cascade]"

where devicename is the name of the particular device, v is a version number, scope indicates the ports covered, bo is the business owner identifier, so is the security owner, ac is the additional contact, include is a reference to an external resource to be included, and mi is a URL for more information.

In some illustrative embodiments, mechanisms are provided, such as in a DNS server, for accessing the information stored for the device, such as through a reverse resolution of the device address. For example, for a sample address "a.b.c.d", the information for the device may be obtained through a reverse resolution of the device address using a request of the type "d.c.b.a.in-addr.arpa IN PTR devicename.devicedomain.tld," where "in-addr" is the internet address, IN PTR is the internet pointer resource record (RR) type record, and the "devicename.devicedomain.tld is the name of the subject resource/device within the hierarchy of top-level domain (TLD)->domain [->optional subdomain]->device.

In some illustrative embodiments, a mechanism is also provided that permits a client computing device, compliant with the protocol of the illustrative embodiments, to extract attribution information for an address from the response from the DNS server. For example, in some illustrative embodiments, these mechanisms may extract attestation information for the example IP address 198.23.74.220 as follows:

(1) $ dig A dc.4a.17c6.ip4.static.sl-reverse.com.
(2) dc.4a.17c6.ip4.static.sl-reverse.com. 86400 IN A 198.23.74.220
(3) $ dig -x 198.23.74.220
(4) 220.74.23.198.in-addr.arpa. IN PTR dc.4a.17c6.ip4.static.sl-reverse.com.
(5) $ dig TXT dc.4a.17c6.ip4.static.sl-reverse.com.|grep v=attrib1
(6) 220.74.23.198.in-addr.arpa. IN TXT "v=attrib1; bo=IBM Cloud; so=IBM Security; oo=IBM Consulting; mi=https://cloud.ibm.com/devices/dc4a17c6"

The first line (1) in the example above represents a forward resolution query for the address (A) of the named resource dc.4a.17c6.ip4.statis.sl-reverse.com. The second line (2) represents the answer returned by DNS, the corresponding IN A resource record, fully specified, including the 86400-second validity or time-to-live period for the answer.

The third line (3) in the example above is a reverse resolution request. The -x flag indicates a request for simplified reverse lookups in the "dig" tool, for mapping addresses to names. The addr is an IPV4 address in dotted-decimal notation, or a colon-delimited IPv6 address. When the -x is used, there is no need to provide the name, class, and type arguments. The dig tool automatically performs a lookup for a name, like 94.2.0.192.in-addr.arpa, and sets the query type and class to PTR and IN, respectively.

The fourth line (4) above is the answer returned by DNS, i.e., the corresponding IN PTR resource record fully specified, where the optional TTL value is not present. The two answers put together are full circle confirmed.

The fifth line (5) above is the query made to DNS for the textual resource record type for the subject resource. It should be noted that DNS fully supports multiple records of the same type for a single resource (e.g., many addresses --IN A-- for the same name). In addition, the fifth line (5) includes a get regular expression command to filter the replies to just the TXT records that meet the specification of the illustrative embodiments. It should be noted that there may be many different types of information encoded in a IN TXT resource record type.

The sixth line (6) of the example represents a filtered answer returned by DNS of an authoritative attribution assertion using the mechanisms of one or more of the illustrative embodiments. This filtered answer is presented in a tuple key-value pairs syntax, for example.

The example above illustrates one possible lookup chain that may be implemented using the mechanisms of the illustrative embodiments. That is, the above example shows one possible series of lookups that starting from a resource's IP address or a resource's name such that one can arrive at an authoritative attestation expressed in a tuple key-value pair language/scheme in accordance with one or more of the illustrative embodiments.

In some illustrative embodiments a mechanism is also provided that permits a client computing device, which is not necessarily a protocol compliant client computing device, to extract attestation information for an address from the response from the DNS server. For example, in some illustrative embodiments, these mechanisms may extract attestation information for the example IP address 198.23.74.220 as follows:

$ telnet 198.23.74.220 qotd
"v=attrib1; bo=IBM Cloud; so=IBM Security; oo=IBM Consulting; mi=https://cloud.ibm.com/devices/dc4a17c6"

A protocol "compliant" computing device is one that is configured to implement the lookup chain discussed previously. It should be appreciated that the manner in which information is laid out in DNS, to encode the attestation/attribution information in a IN TXT resource record in accordance with one or more of the illustrative embodiments is one consideration. The manner in which a QOTD protocol, or other similar short text protocol, generation program would perform a lookup chain such as that described above is another consideration. A computing device that is not protocol compliant with the protocol of the illustrative embodiments, will simply return a random quip or short text response, e.g., a quote of the day. In the case of a non-compliant computing device, with the example shown above for not necessarily compliant computing devices, a computing device performs operations in accordance with one or more of the illustrative embodiments, regardless of using interception, directly, or even recursively, to provide attestation directly to a client computing device making the request. That is, with the mechanisms of the illustrative embodiments, the client computing device simply tries to connect to the subject resource and is automatically given the appropriate attestation information.

In some illustrative embodiments, the above mechanisms are combined as an embodiment in which the end-device, e.g., an Internet of Things (IoT) device, performs a lookup chain as indicated and returns the final value as indicated above. In such illustrative embodiments, the layout of the information within the DNS constructs, the input of the information according to the layout by independent practitioners, and the mechanisms of the illustrative embodiment used to retrieve the information from DNS are combined.

In some illustrative embodiments, the mechanisms of the illustrative embodiments may be implemented as part of a transparent middle-box device adjacent to the client computing device, where this transparent middle-box device is enabled as a responder to client requests for attestation. For example, the middle-box device may be a network attached device, e.g., server or Internet of Things (IoT) device, or the like, that transparently intercepts a connection request, e.g., Synchronize Sequence Number (SYN) segment, and forwards the request to a server computing device that is configured to be compliant with the protocol of the illustrative embodiments and performs the lookup as discussed above. Should there be attribution information, the server computing device sends the acknowledgement response, e.g., the SYN/ACK segment, and the attribution information subsequently, otherwise the connection request is copied for processing by the end device as normal, e.g., the SYN segment is copied for processing by the end device as normal.

In some illustrative embodiments, a recursive lookup of attribution attestations is performed in a hierarchical manner in order to make best effort attribution of the device. That is, multiple interactions may be automatically performed with the DNS server to attempt to find attestation information. These interactions may be from a most specific level to a more general level of attestation information. For example, a first interaction may request attestation information for a specific IP address, e.g., device ID or subnet ID of the IP address, and may recurse up the levels of the IP address to a highest level of IP address, e.g., host ID, attempting to find attestation information for the corresponding level.

Thus, in some illustrative embodiments, mechanisms are provided that implement a key-value tuple based language for expressing attribution information in a standardized fashion. In some illustrative embodiments, mechanisms are provided for compliant client computing devices to extract attribution information from distributed DNS servers. In some illustrative embodiments, mechanisms are provided for configuring network middle boxes to provide attribution information for computing devices within their network segment or local area network. The middle box is a computing device on the network that is not directly addressed by the client device when trying to connect to a target/end device to query its attribution information. By virtue of the middle box's programming, the middle box performs the attribution lookup chain, in accordance with the illustrative embodiments, and returns the answer to the client computing device. From the client computing device's perspective, the answer comes from the end device when in reality, the middle box provided the requested information. In this fashion, the attestation can come from the network without having to make every device on the network complaint to the protocol or specification of the illustrative embodiments.

In some illustrative embodiments, mechanisms are provided for end devices to provide attribution information to client computing devices. In some illustrative embodiments, mechanisms are provided to implement an attribution service in band and within established Transmission Control Protocol (TCP) flows. Moreover, in some illustrative embodiments, mechanisms are provided for hierarchical attestations to be applied by degree of specificity.

Thus, with the mechanisms of the illustrative embodiments, especially in cases where attribution of ownership is of critical importance, such as in the case where an owner of an IP address may transfer operational control to a delegated authority via a mutually agreed method, a reliable attribution language and protocol are provided that may be integrated into legacy systems utilizing limited size text services and DNS records. For example, by enabling a pointer to a remote resource (e.g., Uniform Resource Locator (URL) or another DNS record) the operator of a remote resource can make independent and finer grained attribution statements or attestations about the device in question.

Owing to the nature of PTR resource records (RRs) the authoritative owner of a range of IP addresses may use the mechanisms of the illustrative embodiments to make attestations for differently scoped ranges. That is to say that, in the case of hanging a PTR record for a partially specified address, the client computing device, which is compliant with the protocol of the illustrative embodiments, will locate this assertion should a more specific assertion not be available.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides a network-based attestation engine that operates in conjunction with a domain name service (DNS) and/or protocol compliant servers and end devices. The improved computing tool implements mechanism and functionality, such as the network-based attestation engine, which cannot be practically performed by human beings either outside of, or with the assistance of, a technical environment, such as a mental process or the like. The improved computing tool provides a practical application of the methodology at least in that the improved computing tool is able to implement network-based attestation of devices within a framework of mechanisms that may be implemented within existing DNS mechanisms and thus, can be utilized by legacy computing systems.

FIG. 2 is an example diagram of a distributed data processing system environment in which aspects of the illustrative embodiments may be implemented and at least some of the computer code involved in performing the inventive methods may be executed. That is, computing environment 200 contains an example of an environment for the execution of at least some of the computer code involved in performing the inventive methods, such as network-based attestation engine 250 which operates in conjunction with a DNS system 260 configured to implement the language and protocol of the network-based attestation engine 250 with regard to the attestation information stored in the resource records (RRs) of the DNS system 260 and its layout, with the network-based attestation engine 250 comprising the logic for accessing this attestation information from the RRs of the DNS system 260, such as performing the lookup chain operations described herein. In addition to network-based attestation engine 250, computing environment 200 includes, for example, computer 201, wide area network (WAN) 202, end user device (EUD) 203, remote server 204, public cloud 205, and private cloud 206. In this embodiment, computer 201 includes processor set 210 (including processing circuitry 220 and cache 221), communication fabric 211, volatile memory 212, persistent storage 213 (including operating system 222 and network-based attestation engine 250, as identified above), peripheral device set 214 (including user interface (UI) device set 223, storage 224, and Internet of Things (IoT) sensor set 225), and network module 215. Remote server 204 includes remote database 230. Public cloud 205 includes gateway 240, cloud orchestration module 241, host physical machine set 242, virtual machine set 243, and container set 244.

Computer 201 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 230. As is well understood in the art of computer technology, and depending upon the technology, performance of a computer-implemented method may be distributed among multiple computers and/or between multiple locations. On the other hand, in this presentation of computing environment 200, detailed discussion is focused on a single computer, specifically computer 201, to keep the presentation as simple as possible. Computer 201 may be located in a cloud, even though it is not shown in a cloud in FIG. 2. On the other hand, computer 201 is not required to be in a cloud except to any extent as may be affirmatively indicated.

Processor set 210 includes one, or more, computer processors of any type now known or to be developed in the future. Processing circuitry 220 may be distributed over multiple packages, for example, multiple, coordinated integrated circuit chips. Processing circuitry 220 may implement multiple processor threads and/or multiple processor cores. Cache 221 is memory that is located in the processor chip package(s) and is typically used for data or code that should be available for rapid access by the threads or cores running on processor set 210. Cache memories are typically organized into multiple levels depending upon relative proximity to the processing circuitry. Alternatively, some, or all, of the cache for the processor set may be located "off chip." In some computing environments, processor set 210 may be designed for working with qubits and performing quantum computing.

Computer readable program instructions are typically loaded onto computer 201 to cause a series of operational steps to be performed by processor set 210 of computer 201 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 221 and the other storage media discussed below. The program instructions, and associated data, are accessed by processor set 210 to control and direct performance of the inventive methods. In computing environment 200, at least some of the instructions for performing the inventive methods may be stored in network-based attestation engine 250 in persistent storage 213.

Communication fabric 211 is the signal conduction paths that allow the various components of computer 201 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 212 is any type of volatile memory now known or to be developed in the future. Examples include dynamic type random access memory (RAM) or static type RAM. Typically, the volatile memory is characterized by random access, but this is not required unless affirmatively indicated. In computer 201, the volatile memory 212 is located in a single package and is internal to computer 201, but, alternatively or additionally, the volatile memory may be distributed over multiple packages and/or located externally with respect to computer 201.

Persistent storage 213 is any form of non-volatile storage for computers that is now known or to be developed in the future. The non-volatility of this storage means that the stored data is maintained regardless of whether power is being supplied to computer 201 and/or directly to persistent storage 213. Persistent storage 213 may be a read only memory (ROM), but typically at least a portion of the persistent storage allows writing of data, deletion of data and re-writing of data. Some familiar forms of persistent storage include magnetic disks and solid state storage devices. Operating system 222 may take several forms, such as various known proprietary operating systems or open source Portable Operating System Interface type operating systems that employ a kernel. The code included in network-based attestation engine 250 typically includes at least some of the computer code involved in performing the inventive methods.

Peripheral device set 214 includes the set of peripheral devices of computer 201. Data communication connections between the peripheral devices and the other components of computer 201 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 223 may include components such as a display screen, speaker, microphone, wearable devices (such as goggles and smart watches), keyboard, mouse, printer, touchpad, game controllers, and haptic devices. Storage 224 is external storage, such as an external hard drive, or insertable storage, such as an SD card. Storage 224 may be persistent and/or volatile. In some embodiments, storage 224 may take the form of a quantum computing storage device for storing data in the form of qubits. In embodiments where computer 201 is required to have a large amount of storage (for example, where computer 201 locally stores and manages a large database) then this storage may be provided by peripheral storage devices designed for storing very large amounts of data, such as a storage area network (SAN) that is shared by multiple, geographically distributed computers. IoT sensor set 225 is made up of sensors that can be used in Internet of Things applications. For example, one sensor may be a thermometer and another sensor may be a motion detector.

Network module 215 is the collection of computer software, hardware, and firmware that allows computer 201 to communicate with other computers through WAN 202. Network module 215 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 215 are performed on the same physical hardware device. In other embodiments (for example, embodiments that utilize software-defined networking (SDN)), the control functions and the forwarding functions of network module 215 are performed on physically separate devices, such that the control functions manage several different network hardware devices. Computer readable program instructions for performing the inventive methods can typically be downloaded to computer 201 from an external computer or external storage device through a network adapter card or network interface included in network module 215.

WAN 202 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 203 is any computer system that is used and controlled by an end user (for example, a customer of an enterprise that operates computer 201), and may take any of the forms discussed above in connection with computer 201. EUD 203 typically receives helpful and useful data from the operations of computer 201. For example, in a hypothetical case where computer 201 is designed to provide a recommendation to an end user, this recommendation would typically be communicated from network module 215 of computer 201 through WAN 202 to EUD 203. In this way, EUD 203 can display, or otherwise present, the recommendation to an end user. In some embodiments, EUD 203 may be a client device, such as thin client, heavy client, mainframe computer, desktop computer and so on.

Remote server 204 is any computer system that serves at least some data and/or functionality to computer 201. Remote server 204 may be controlled and used by the same entity that operates computer 201. Remote server 204 represents the machine(s) that collect and store helpful and useful data for use by other computers, such as computer 201. For example, in a hypothetical case where computer 201 is designed and programmed to provide a recommendation based on historical data, then this historical data may be provided to computer 201 from remote database 230 of remote server 204.

Public cloud 205 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 205 is performed by the computer hardware and/or software of cloud orchestration module 241. The computing resources provided by public cloud 205 are typically implemented by virtual computing environments that run on various computers making up the computers of host physical machine set 242, which is the universe of physical computers in and/or available to public cloud 205. The virtual computing environments (VCEs) typically take the form of virtual machines from virtual machine set 243 and/or containers from container set 244. It is understood that these VCEs may be stored as images and may be transferred among and between the various physical machine hosts, either as images or after instantiation of the VCE. Cloud orchestration module 241 manages the transfer and storage of images, deploys new instantiations of VCEs and manages active instantiations of VCE deployments. Gateway 240 is the collection of computer software, hardware, and firmware that allows public cloud 205 to communicate through WAN 202.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 206 is similar to public cloud 205, except that the computing resources are only available for use by a single enterprise. While private cloud 206 is depicted as being in communication with WAN 202, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 205 and private cloud 206 are both part of a larger hybrid cloud.

As shown in FIG. 2, one or more of the computing devices, e.g., computer 201 or remote server 204, may be specifically configured to implement a network-based attestation engine 250 which operates in conjunction with a DNS system 260 configured to implement the language and protocol of the network-based attestation engine 250 with regard to the attestation information stored in resource records (RRs) of the DNS system 260. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computing device 201 or remote server 204, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates network-based attestation of computing devices without requiring additional network infrastructure or the client devices performing attestation operations attesting their own ownership. The attestation is performed from the network perspective and is implemented by repurposing existing constructs for the network attestation process.

Figure 3:
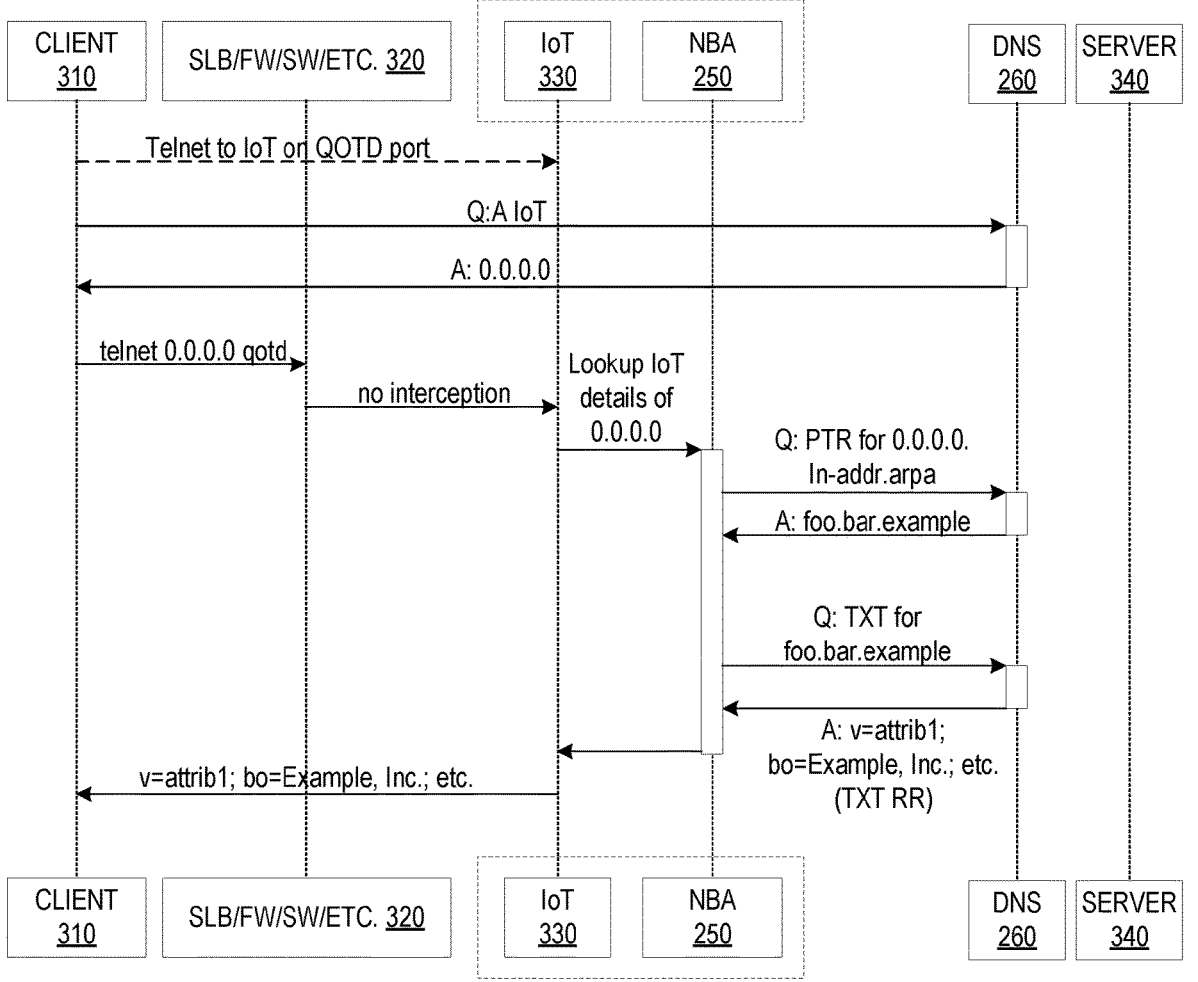
FIG. 3 shows a sequence diagram of one illustrative embodiment in which an end device, compliant with the network-based attestation protocol of the illustrative embodiments, does not perform interception of the attestation request from the client computing device.
Figure 4:
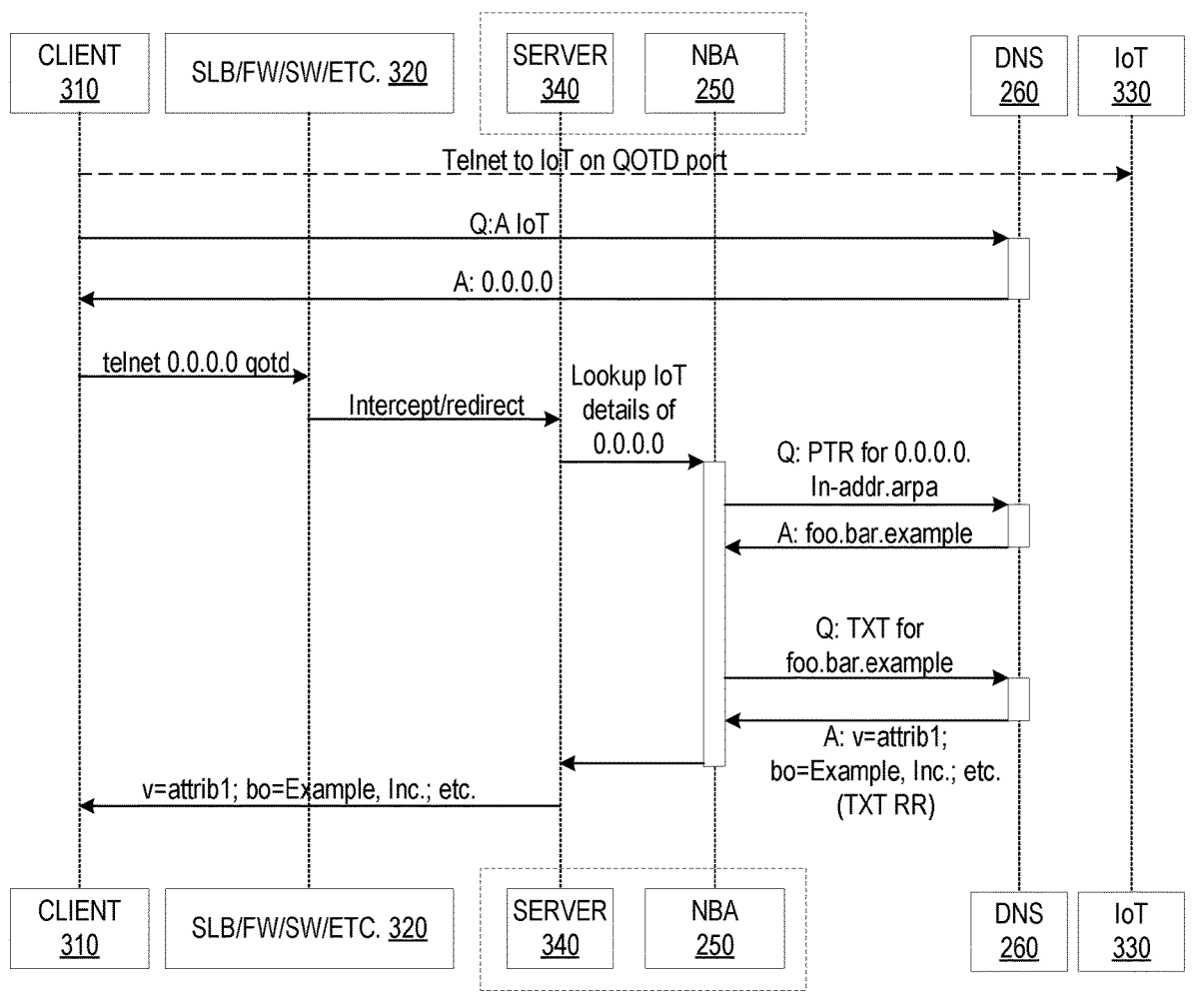
FIG. 4 shows a sequence diagram of one illustrative embodiment in which a server intercepts the attestation request from the client computing device.
Figure 5:
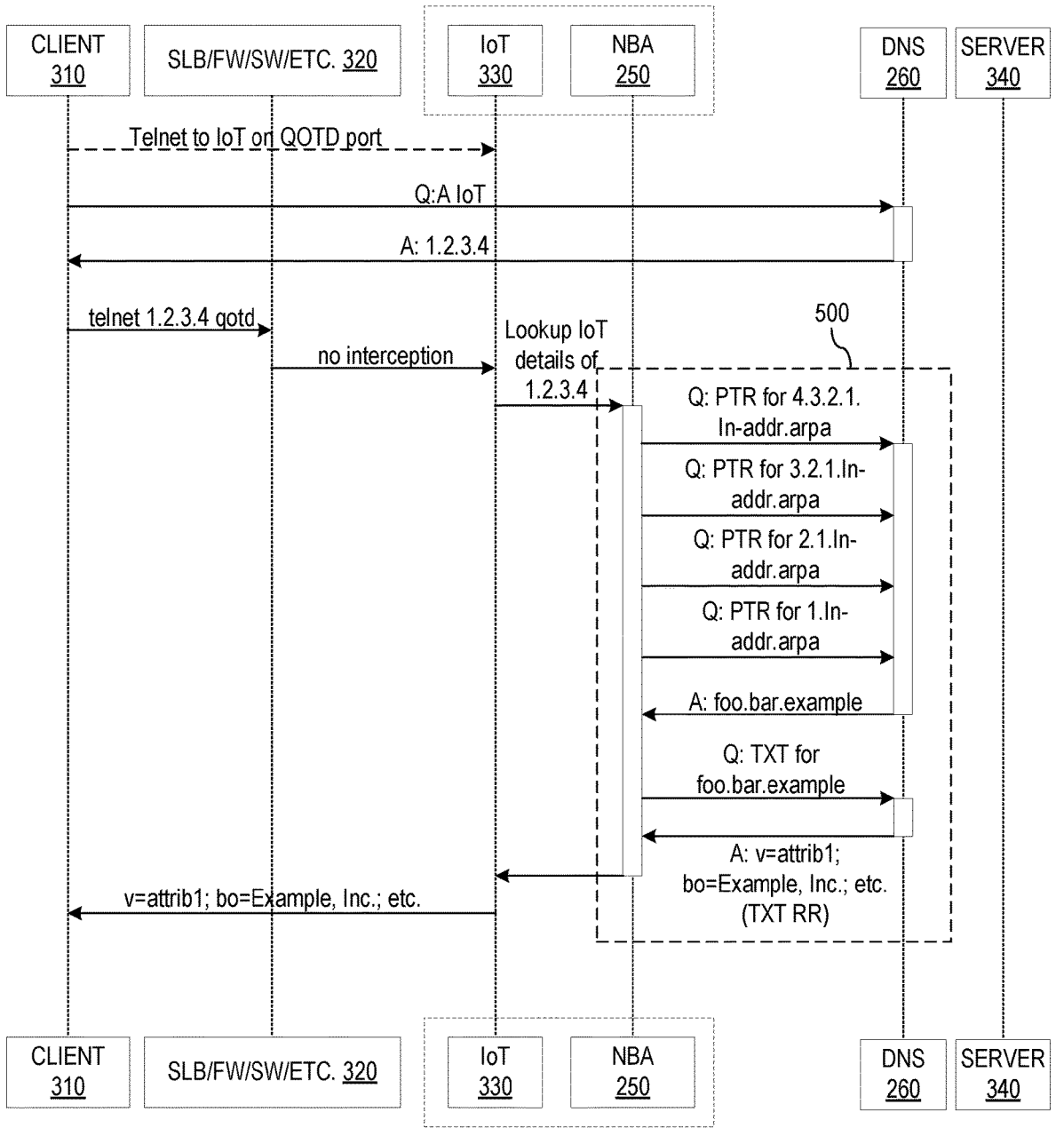
FIG. 5 shows a sequence diagram of one illustrative embodiment in which a recursive attestation is performed.

FIGS. 3-5 are example sequence diagrams illustrating a data flow between components of a network-based attestation framework in accordance with various embodiments of the present invention. FIG. 3 shows a sequence diagram of one illustrative embodiment in which an end device, compliant with the network-based attestation protocol of the illustrative embodiments, does not perform interception of the attestation request from the client computing device. FIG. 4 shows a sequence diagram of one illustrative embodiment in which a server intercepts the attestation request from the client computing device. FIG. 5 shows a sequence diagram of one illustrative embodiment in which a recursive attestation is performed.

Each of the illustrations in FIGS. 3-5 use common reference numerals for the various components of the network-based attestation framework. These components are as follows:

Client 310: a naïve client looking to find attestation information as per the mechanisms of the network-based attestation protocol of the illustrative embodiments using the repurposing of a limited text string response service, such as the QOTD service.

Network Pass-Through Device (e.g., SLB/FW/SW/etc.) 320: a network-based device optionally able to transparently intercept network traffic for a given port and redirect it to a server device compliant to the network-based attestation protocol of the illustrative embodiments.

Internet of Things (IoT) device 330: a network-based device that is unaware of the network-based attestation protocol specification of the illustrative embodiments, or optionally is able to perform the functions of a server, such as server 340, in some illustrative embodiments. The IoT device 330 may be any network (e.g., Internet) addressable device, physical or virtual, for which attestations of ownership, control, or responsibility may be made by its owner.

Server 340: a server computing device compliant to the network-based attestation protocol specification of the illustrative embodiments.

Network-based Attestation (NBA) engine 250: logic implemented in conjunction with the DNS 260 to implement the storage of attestation information in resource records and the lookup of resource records to identify attestation information and respond to attestation requests via a limited text string response service, such as the QOTD service.

DNS 260: a Domain Name Service (DNS) server which possesses resource records storing attestation information in accordance with the illustrative embodiments.

In addition to these components, in accordance with the network-based attestation protocol logic of the server 340 and/or IoT device 330 of the illustrative embodiments, the DNS 260 stores, in the text resource records (RRs) of the DNS 260, attestation information in accordance with a specification, or layout, which in some illustrative embodiments is a tuple based language. This tuple-based language includes designations of the scope and ownership of a particular device associated with a network address (assumed to be an Internet Protocol (IP) address as one example) and textual reference, e.g., a URL or the like. The information to populate this tuple-based language comes from the operator/owner of the network in which the particular device operates. The operator/owner may add any, all, or none of the tuples into the corresponding resource record (RR) maintained by the DNS 260. While the illustrative embodiments provide examples of some of these tuple-value pairings, the illustrative embodiments are not limited to those given as examples and other types of key-value tuples may be used in addition to, or in replacement of, those example tuple-value pairs described herein. There may be other key-value tuples that we may not have thought about. Pedantically it could be "color" or "inventory asset tag". We really want to cover the fact that Thus, any key-value pair, e.g., color-value, inventory asset tag-value, etc., may be added to a IN TXT resource record (RR) in accordance with the specification of conveying attestation or attribution information without departing from the spirit and scope of the present invention.

For example, the RRs of the DNS 260 may implement delimiter, e.g., semi-colon, separated key-value tuples in a DNS TXT resource record (RR). As noted previously, an example of a TXT record according to one illustrative embodiment may be of the type:

devicename IN TXT "v=attrib1; scope=[ports covered]; bo=[business owner]; so=[security owner]; ac=[additional contact]; include=[external reference]; mi=[URL for more information]; [cascade]"

In the above example, the various key-value pairs constitute attestation information that may be used by computing logic to attest to the ownership of a particular network addressable device. Thus, with the mechanisms of the illustrative embodiments, the NBA engine 250 provides the automatically implemented computer logic for performing lookup and parsing of RRs from the DNS server 260 to obtain and extract attestation information, e.g., the key-value tuples, for a particular network addressable device when the DNS server 260 returns such RRs in response to an address request.

Moreover, the DNS server 260 comprises logic for accessing the information stored for the device, e.g., an IoT device for which a client computing device wishes to obtain ownership information, through a reverse resolution of the device address. Also, mechanisms are provided that permit a client computing device 310, compliant with the network-based attestation protocol of the illustrative embodiments, to extract attribution information for an address from the response from the DNS server 260. That is, the logic implemented by the NBA engine 250 may comprise lookup logic 252 and parser/extractor 254 to both lookup the RRs, via the DNS 260, corresponding to devices and to extract the attestation information from these RRs returned by the DNS 260.

In each of the depicted embodiments, a client computing device, e.g., 310, is attempting to obtain ownership information for an IoT device 330, and the network-based attestation lookup device (e.g., either the IoT 330 device or server 340) performs a lookup of the network-based attestation information using the same basic operations, as follows. As an example, assume that Alice, a consumer, would like to connect to Service Provider Bob's computing device from Alice's computing device. Before doing so, Alice would like to establish the bona fide ownership of Bob's computing device. With the mechanisms of the illustrative embodiments, Alice knows that she can do so by simply connecting to the QOTD port on Bob's computing device. Using the mechanisms of one or more of the illustrative embodiments, the network operator where Bob's computing device resides is able to provide information about Bob's computing device. In so doing, Alice can learn, from the network operator, the network allocation that Bob's device is using, and that it either is, or is not, an allocation to Bob's company. Thus, if an issue occurs with the connection to the Service Provider Bob's computing device, then Alice has the necessary information to know what party is responsible for resolving that issue.

In the depicted examples, starting from an IP address (e.g., IPv4 or IPv6), a reverse DNS resolution operation is performed to find out the canonical name of the network address. In recursive embodiments, multiple reverse resolutions are applied if a first lookup does not yield a canonical name, as will be described hereafter with regard to FIG. 5.

Regardless of whether recursion is implemented or not, upon discovery of a first canonical name, a forward DNS resolution step is performed, however not for the typical discovery of a network address (A or AAAA for IPV4 or IPV6, respectively), but for any generic textual information related to this named resource, e.g., a TXT record type. Upon receipt of generic textual information being received, a parser of the NBA engine 250 is used to extract the textual information that is compliant to the network-based attestation protocol specification for attribution, e.g. v=attrib1; bo=[business owner]; so=[security owner]; ac=[additional contact]; include=[external reference]; mi=[URL for more information], etc. Should such information be found in the record, e.g., the RR of the DNS 260, it is passed to the requesting client 310, which may be undecoded, otherwise a null string is returned to the client 310.

FIG. 3 illustrates a sequence diagram from a client computing device point of view, where the client computing device naively requests attestation information, and where the IoT device 330 participates in the attestation and has a co-resident NBA engine 250 that comprises the logic for performing the lookup and parsing of attestation information from the DNS 260. This sequence describes a client 310 that is unaware of all machinations that happen "underneath the covers" by a compliant network facility, e.g., the NBA engine 250 and DNS 260, to provide the requested attestation information. The client 310 merely attempts a connection to a well-known port, e.g., the QOTD service port, e.g., port 17, and all other operations for performing the requested attestation are made without the knowledge of the client 310.

As shown in FIG. 3, the client 310 sends a connection request using a connection protocol, e.g., telnet, attempting to connect to the IoT device 330 on the well-known port, as represented by the dashed line. The query Q:A IoT illustrates a query that is sent by the client computing device 310 to the DNS server 260 for the address of the IoT device. The DNS 260 responds with the address of the IoT 330, e.g., A: 0.0.0.0 in this example. The client 310 then issues a connection request to the specified port, e.g., the QOTD port, using the returned address 0.0.0.0. This request is passed through one or more pass-through devices 320 of the data network, such as a server load balancer (SLB), firewall (FW), switch (SW), or the like, to the IoT device 330 which initiates a lookup of the device attestation information for the address 0.0.0.0 at the IoT device 330, referred to in the diagram as the "lookup IoT details of 0.0.0.0."

The process of performing the lookup of the attestation information for the address 0.0.0.0 involves the NBA engine 250, implemented on the IoT device 330, sending a request or query (Q) for the pointer resource record (PTR) for the address in the DNS 260 resource records (RRs). The DNS 260 returns the canonical name for the specified address, e.g., A: foo.bar.example in FIG. 3. The NBA engine 250 then sends a request or query for a text record for the provided canonical name, e.g., Q: TXT for foo.bar.example. The DNS 260 performs a lookup of the resource record (RR) for the specified canonical name "foo.bar.example" to retrieve the TXT resource record (RR) corresponding to the canonical name. In accordance with the illustrative embodiments, the DNS 260 is configured to implement the network-based attestation protocol and store attestation information in the TXT RR for the canonical name. Thus, the DNS 260 returns, to the network-based attestation engine 250 of the IoT device 330, the TXT RR including the various attestation information. The NBA engine 250 parses the TXT RR and extracts the attestation information which is then provided to the client 310.

It should be noted that, in this illustrative embodiment, there is no interception of the client 310 request, e.g., the "telnet 0.0.0.0 qotd" request, by a server 340 to perform a lookup of the device details for the given address. That is, the IoT device 330 itself is configured to implement the network-based attestation via the NBA engine 250 and thus, has the NBA engine 250 logic for performing the lookup operation of the attestation information and the parsing logic for parsing the received textual resource record from the DNS 260 and providing the extracted attestation information to the client 310. This requires a configuring of the IoT device 330. However, other illustrative embodiments provide for retrofitting of the illustrative embodiments to existing deployment environments, e.g., existing cloud deployment models.

FIG. 4 is an example sequence diagram of one illustrative embodiment in which a server intercepts the attestation request from the client computing device. A key differential between the example sequence diagram of FIG. 4 and the sequence diagram of FIG. 3 is that in FIG. 4 the NBA engine

250 is implemented on the server 340 such that the server 340 intercepts the request, e.g., "telnet 0.0.0.0 qotd", upstream of the IoT device 330. The server 340 intercepts the request and the NBA engine 250 of the server 340 processes the request for attribution based on the operations of the NBA engine 250 previously described above. This illustrative embodiment allows retrofitting the NBA engine 250 logic across existing deployments, e.g., any cloud deployment model, as the NBA engine 250 is implemented in the server and does not require any configuring of the IoT device 330. In particular, the SLB/FW/SW/etc. is a network middle box that intercepts the QOTD query and delivers the QOTD query to the protocol compliant server 340 and as such, engages the retrofitting of the attestation mechanism of this illustrative embodiment for any IoT device 330. One benefit of this configuration is that the server 340 can perform attestations for an arbitrary number of IoTs 330. In so doing, specialized configuration of every existing computing device on the network, e.g., the Internet, as it already exists does not need to be performed, and future computing devices connected to the network need not be specially configured, to participate in the network based attestation operation of the illustrative embodiments.

As shown in FIG. 4, the client 310 sends a connection request using a connection protocol, e.g., telnet, attempting to connect to the IoT device 330 on the well-known port, as represented by the dashed line. The query Q:A IoT illustrates a query that is sent by the client computing device 310 to the DNS server 260 for the address of the IoT device. The DNS 260 responds with the address of the IoT 330, e.g., A: 0.0.0.0 in this example. The client 310 then issues a connection request to the specified port, e.g., the QOTD port, using the returned address 0.0.0.0. This request is passed through one or more pass-through devices 320 of the data network, such as a server load balancer (SLB), firewall (FW), switch (SW), or the like, and is intercepted or redirected to the server 340 which initiates a lookup of the device attestation information for the address 0.0.0.0 at server 340 which has been configured with the NBA engine 250. This lookup is denoted as "lookup IoT details of 0.0.0.0."

The process of performing the lookup of the attestation information for the address 0.0.0.0 involves the NBA engine 250, implemented on the server 340, sending a request or query (Q) for the pointer resource record (PTR) for the address in the DNS 260 resource records (RRs). The DNS 260 returns the canonical name for the specified address, e.g., A: foo.bar.example in FIG. 4. The NBA engine 250 then sends a request or query for a text record for the provided canonical name, e.g., Q: TXT for foo.bar.example. The DNS 260 performs a lookup of the resource record (RR) for the specified canonical name "foo.bar.example" to retrieve the TXT resource record (RR) corresponding to the canonical name. In accordance with the illustrative embodiments, the DNS 260 is configured to implement the network-based attestation protocol and store attestation information in the TXT RR for the canonical name. Thus, the DNS 260 returns, to the network-based attestation engine 250 of the server 340, the TXT RR including the various attestation information. The NBA engine 250 parses the TXT RR and extracts the attestation information which is then provided to the client 310.

FIGS. 3 and 4 assume a single layer of lookup of the attribution information for the fully specified device address. However, in other illustrative embodiments, a recursive lookup of partially specified device addresses such that a hierarchical lookup of a canonical name at various levels of hierarchy, from most specific to more general, is made possible. That is, if a canonical name cannot be found having a corresponding resource record (RR) in the DNS 260 at a most specific level, subsequent recursive requests may be performed with partially specified addresses at higher levels of the hierarchy until a canonical name can be found in the DNS 260 and then that canonical name at that particular level of the hierarchy may be used to perform the retrieval and extraction of attestation information from a corresponding text resource record.

FIG. 5 shows a sequence diagram of one illustrative embodiment in which a recursive attestation is performed. As shown in FIG. 5, a compliant device, such as the IoT device 330 or server 340 (an embodiment in which the NBA engine 250 is implemented in the IoT device 330 is shown) configured to implement the NBA engine 250, performs subsequent resolutions for partially specified addresses in a recursive manner to find a device canonical name for a partially specified address. The sequence shown in FIG. 5 is similar to the sequence in FIG. 3, with the exception of the interaction 500 between the NBA engine 250 of the IoT device 330 and the DNS 260. As shown in FIG. 5, the process of queries in the interaction of 500 recursively attempts to find an address resolution to a canonical name, e.g., a PTR for the specified address, at various levels of specificity. For example, the first query specifies the full address, e.g., down to the device identifier level, followed by a partial address at the next higher level, e.g., a subnet level, followed by a partial level at a next higher level, etc., up to the host level.

At any point during this recursive query process, if the DNS 260 returns a PTR with a canonical name for the partially specified address, the canonical name at that level is then used to retrieve the corresponding text resource record having its corresponding attribution information. Thus, for example if the IoT device 330 is requested to find out the details for the address "1.2.3.4", the NBA engine 250 of the IoT device 330 initially performs a lookup for the PTR for 1.2.3.4, as indicated above, followed by lookup for PTR for 1.2.3, and 1.2 and finally 1. The NBA engine 250 stops at the first response and proceeds to looking up the text (TXT) resource record in the DNS 260 for the provided value. The NBA engine 250 then provides the parsed and extracted attestation information back to the client 310.

While FIG. 5 shows the NBA engine 250 implementing the recursive lookup and retrieval of attestation information, in the IoT device 330, the recursive lookup and retrieval can also be performed by an NBA engine 250 implemented in the server 340. That is, the server 340 may be configured with an NBA engine 250 as shown in FIG. 4, with that NBA engine 250 having logic for performing the recursive lookup of the partially specified addresses as shown in FIG. 5. In this way, the server 340 may intercept requests from the client 310 and the NBA engine 250 may perform the recursive search for the attestation information at the server 340.

The recursive attestation information retrieval and extraction allows attestation information to be specified at different levels of the network. That is, attestation information may be specified for the individual device, for a portion of a local area network, a complete local area network, or the like. This may be beneficial in cases where lower level attestation information does not differ or there is no lower level attestation information available, for example. For example, assume that, from a certain point on down in the network addressing hierarchy, the attestation information is the same. By the mechanisms of the illustrative embodiment, and the recursive attestation information retrieval, a higher level attestation can be made that covers a greater swath, and still allow for lower level (e.g., more specific) attestation information to override the higher level (e.g., less specific) attestations.

Thus, the illustrative embodiments provide an automated improved computing tool and improved computing tool operations/functionality for network-based attestation of devices. The illustrative embodiments provide a network-based attestation engine that comprises logic for performing queries with a DNS to obtain text resource records, e.g., TXT RRs, for specified addresses of devices, where these text resource records comprise attestation information, such as in the form of key-value tuples, which specify ownership of the corresponding device or devices that correspond to the address. In some illustrative embodiments, a recursive lookup and retrieval of such text resource records and hence, attestation information, is made possible such that the attestation information may be for various levels of an address hierarchy. Thus, the illustrative embodiments provide an improved computing tool and improved computing tool operations/functionality to leverage existing network constructs to reliably attest ownership of connected devices directly from the network management plane without incurring the cost and complexity of end-device operations. The illustrative embodiments provide an improved computing tool and improved computing tool operations/functionality that make it possible for network operators to provide attestation information to requesting devices in an automated manner that is not provided by existing mechanisms.

Figure 6:
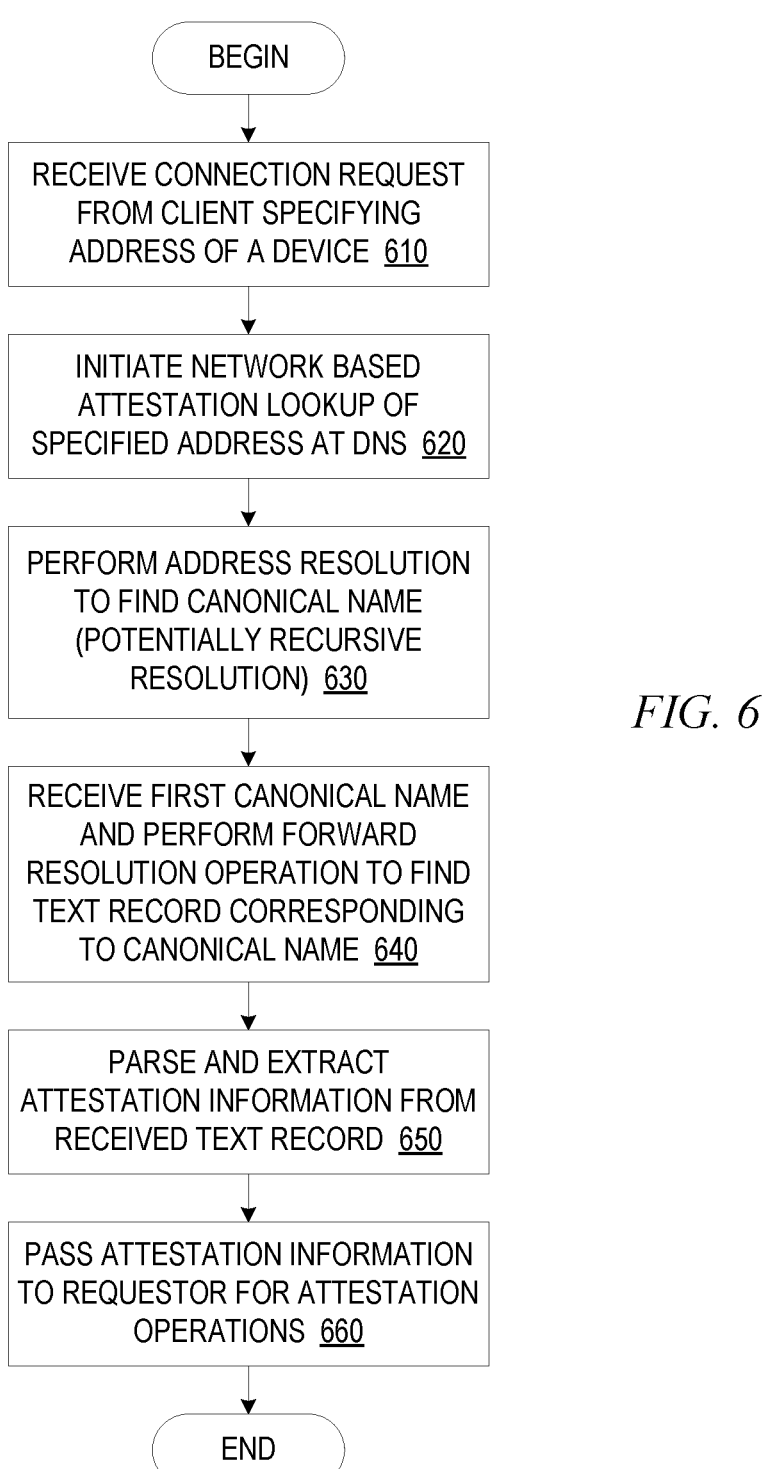
FIG. 6 is a flowchart outlining an example operation of a network-based attestation system in accordance with one illustrative embodiment.

FIG. 6 presents a flowchart outlining an example operation of elements of the present invention with regard to one or more illustrative embodiments. It should be appreciated that the operations outlined in FIG. 6 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIG. 6, and may, in some cases, make use of the results generated as a consequence of the operations set forth in FIG. 6, the operations in FIG. 6 themselves are specifically performed by the improved computing tool in an automated manner.

As shown in FIG. 6, the operation starts by the network-based attestation (NBA) engine, e.g., NBA engine 250, receiving a connection request from a client specifying an address of a device for which attestation information is to be provided (step 610). As shown in FIGS. 3-5, this NBA engine may be implemented on an IoT device or a server device, depending on the desired implementation.

Based on the received request, the NBA engine 250 initiates a network-based attestation lookup of the specified address at the DNS (step 620). In some illustrative embodiments, this lookup operation starts from an IP address (e.g., IPv4 or IPv6) and performs a reverse DNS resolution operation to find out the canonical name of the network address. In recursive embodiments, multiple reverse resolutions are applied if a first lookup does not yield a canonical name, as described hereafter above with regard to FIG. 5 (step 630). Upon discovery of a first canonical name, a forward DNS resolution operation is performed to obtain a text resource record, e.g., TXT RR, corresponding to the canonical name (step 640). Upon receipt of the textual information, e.g., the TXT RR, a parser of the NBA engine is used to extract the textual information that is compliant to the network-based attestation protocol specification (step 650). Should such information be found in the text resource record, it is passed to the requesting computing device from which the original request was received (step 660) for performance of attestation operations; otherwise, a null string is returned. The operation then terminates.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for computing device attestation, the method comprising:
   receiving at a network-based attestation engine, from a requestor computing device that is separate from a target computing device, an attestation request for attestation of the target computing device, wherein the network-based attestation engine is implemented in a domain name service (DNS) server computing device that is separate from the target computing device and that intercepts the attestation request which comprises a computing device network address of the target computing device;
   performing a first lookup operation of the computing device network address in the domain name service (DNS) server computing device to obtain a device name for the target computing device;
   performing a second lookup operation of the device name in the DNS server to obtain a text resource record corresponding to the device name, wherein the text resource record stores attestation information for the target computing device corresponding to the device name;
   parsing the text resource record to extract the attestation information from the text resource record; and
   returning the attestation information to the requestor computing device to perform attestation of the target computing device.

2. The method of claim 1, wherein the attestation request is directed to a short text message service port of the target computing device, and wherein the attestation request is redirected to a network-based attestation engine of the data processing system that executes operations to perform the first lookup operation, second lookup operation, parsing the text resource record, and returning the attestation information to the requestor computing device.

3. The method of claim 2, wherein the short text message service is a quote-of-the-day (QOTD) service.

4. The method of claim 1, wherein the data processing system is the target computing device.

5. The method of claim 1, wherein the data processing system is a server computing device that intercepts the attestation request from the requestor computing device upstream of the target computing device.

6. The method of claim 1, wherein the attestation information stored in the text resource record comprises a key-value tuple structure for expressing attribution information.

7. The method of claim 6, wherein the attestation information stored in the text resource record comprises at least one owner-value tuple that specifies at least one owner of the target computing device.

8. The method of claim 1, wherein performing the first lookup operation comprises:

transmitting at least one query for a pointer resource record in the DNS server corresponding to the computing device network address; and receiving a response from the DNS server specifying the device name.

9. The method of claim 8, wherein transmitting at least one query for a pointer record comprises transmitting a series of queries, each query being at a different level of a hierarchy of the computing device network address expressed as a partial computing device network address.

10. The method of claim 9, wherein transmitting the series of queries comprises transmitting a first query at a lowest level of the hierarchy, and transmitting one or more subsequent queries at sequentially relatively higher levels of the hierarchy until the response from the DNS server is received specifying a device name.

11. A computer program product comprising a non-transitory computer readable storage medium having a computer readable program stored therein, wherein the computer readable program, when executed in a data processing system, causes the data processing system to:

receive at a network-based attestation engine, from a requestor computing device, an attestation request for attestation of a target computing device that is separate from a target computing device, wherein the network-based attestation engine is implemented in a domain name service (DNS) server computing device that is separate from the target computing device and that intercepts the attestation request comprises a computing device network address of the target computing device;

perform a first lookup operation of the computing device network address in a the domain name service (DNS) server computing device to obtain a device name for the target computing device;

perform a second lookup operation of the device name in the DNS server to obtain a text resource record corresponding to the device name, wherein the text resource record stores attestation information for the target computing device corresponding to the device name;

parse the text resource record to extract the attestation information from the text resource record; and return the attestation information to the requestor computing device to perform attestation of the target computing device.

12. The computer program product of claim 11, wherein the attestation request is directed to a short text message service port of the target computing device, and wherein the attestation request is redirected to a network-based attestation engine of the data processing system that executes operations to perform the first lookup operation, second lookup operation, parsing the text resource record, and returning the attestation information to the requestor computing device.

13. The computer program product of claim 12, wherein the short text message service is a quote-of-the-day (QOTD) service.

14. The computer program product of claim 11, wherein the data processing system is a server computing device that intercepts the attestation request from the requestor computing device upstream of the target computing device.

15. The computer program product of claim 11, wherein the attestation information stored in the text resource record comprises a key-value tuple structure for expressing attribution information.

16. The computer program product of claim 15, wherein the attestation information stored in the text resource record comprises at least one owner-value tuple that specifies at least one owner of the target computing device.

17. The computer program product of claim 11, wherein performing the first lookup operation comprises:

transmitting at least one query for a pointer resource record in the DNS server corresponding to the computing device network address; and receiving a response from the DNS server specifying the device name.

18. The computer program product of claim 17, wherein transmitting at least one query for a pointer record comprises transmitting a series of queries, each query being at a different level of a hierarchy of the computing device network address expressed as a partial computing device network address.

19. The computer program product of claim 18, wherein transmitting the series of queries comprises transmitting a first query at a lowest level of the hierarchy, and transmitting one or more subsequent queries at sequentially relatively higher levels of the hierarchy until the response from the DNS server is received specifying a device name.

20. An apparatus comprising:

at least one processor; and at least one memory coupled to the at least one processor, wherein the at least one memory comprises instructions which, when executed by the at least one processor, cause the at least one processor to:

receive at a network-based attestation engine, from a requestor computing device that is separate from a target computing device, an attestation request for attestation of a target computing device, wherein the network-based attestation engine is implemented in a domain name service (DNS) server computing device that is separate from the target computing device and that intercepts attestation request comprises a computing device network address of the target computing device;

perform a first lookup operation of the computing device network address in thedomain name service (DNS) server computing device to obtain a device name for the target computing device;

perform a second lookup operation of the device name in the DNS server to obtain a text resource record corresponding to the device name, wherein the text resource record stores attestation information for the target computing device corresponding to the device name;

parse the text resource record to extract the attestation information from the text resource record; and return the attestation information to the requestor computing device to perform attestation of the target computing device.

* * * * *